US009557815B2

(12) United States Patent
Adachi et al.

(10) Patent No.: US 9,557,815 B2
(45) Date of Patent: Jan. 31, 2017

(54) ELECTRONIC DEVICE

(71) Applicant: Panasonic Corporation, Osaka (JP)

(72) Inventors: Yusuke Adachi, Osaka (JP); Akira Koga, Osaka (JP); Masahiro Inata, Hyogo (JP); Ryo Okumura, Osaka (JP); Naoto Yumiki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 197 days.

(21) Appl. No.: 13/950,751

(22) Filed: Jul. 25, 2013

(65) Prior Publication Data

US 2013/0307804 A1 Nov. 21, 2013

Related U.S. Application Data

(63) Continuation of application No. PCT/JP2012/000039, filed on Jan. 5, 2012.

(30) Foreign Application Priority Data

Feb. 4, 2011 (JP) ................... 2011-022377

(51) Int. Cl.
*G06F 3/01* (2006.01)
*G06F 3/0488* (2013.01)

(52) U.S. Cl.
CPC .............. *G06F 3/016* (2013.01); *G06F 3/0488* (2013.01)

(58) Field of Classification Search
CPC .......... G06F 3/016; G06F 3/023; G06F 3/041; G06F 3/044; G06F 3/048; G06F 3/04886; G06F 3/0414; G06F 1/3203

(Continued)

(56) References Cited

U.S. PATENT DOCUMENTS 7,345,679 B2   3/2008   Katayose
7,952,566 B2   5/2011   Poupyrev et al.
(Continued)

FOREIGN PATENT DOCUMENTS

JP   2004-110388       4/2004
JP   2005-129072 A    5/2005
(Continued)

OTHER PUBLICATIONS

Notice of Reasons for Rejection for corresponding Japanese Patent Application No. 2012-528169 mailed Aug. 6, 2013.
International Search Report for corresponding International Application No. PCT/JP2012/000039 mailed Apr. 10, 2012.
Form PCT/ISA/237 for corresponding International Application No. PCT/JP2012/000039 dated Apr. 10, 2012 and partial English translation.

*Primary Examiner* — Alexander Eisen
*Assistant Examiner* — Abhishek Sarma
(74) *Attorney, Agent, or Firm* — Renner, Otto, Boisselle & Sklar, LLP

(57) ABSTRACT

An electronic device 10 according to an embodiment includes: a display section 12 for displaying an operation area 45 including a reference area 41 and a non-reference area 42; a touch panel 11 provided on a display surface side of the display section 12; an informing section 13 for informing a user of an operation status of the user; a control section 33 and 20 for controlling the operation of the informing section 13; and a distinction section 16 for distinguishing between a first operation where the user searches for the reference area 41 on the touch panel 11 and a second operation which is a key input operation to the operation area 45. The control section 33 and 20 controls the operation of the informing section 13 based on a result of distinction by the distinction section 16.

11 Claims, 12 Drawing Sheets

(58) Field of Classification Search
USPC .................. 345/173–174; 715/773, 835, 863
See application file for complete search history.

(56) References Cited

U.S. PATENT DOCUMENTS

| | | |
|---|---|---|
| 2002/0149561 A1 | 10/2002 | Fukumoto et al. |
| 2005/0085215 A1* | 4/2005 | Kokko .............. H04M 1/72541 455/404.1 |
| 2007/0091070 A1* | 4/2007 | Larsen .................. G06F 3/0213 345/168 |
| 2007/0236474 A1 | 10/2007 | Ramstein |
| 2009/0006991 A1* | 1/2009 | Lindberg ............ G06F 3/04817 715/763 |
| 2010/0167693 A1* | 7/2010 | Yamada .................. H04M 1/67 455/411 |
| 2010/0253652 A1 | 10/2010 | Homma et al. |
| 2011/0167375 A1* | 7/2011 | Kocienda ..................... 715/773 |

FOREIGN PATENT DOCUMENTS

| | | |
|---|---|---|
| JP | 2005-186847 A | 7/2005 |
| JP | 2008-033739 A | 2/2008 |
| JP | 2009-533762 T | 9/2009 |
| JP | 2010-244253 A | 10/2010 |

* cited by examiner

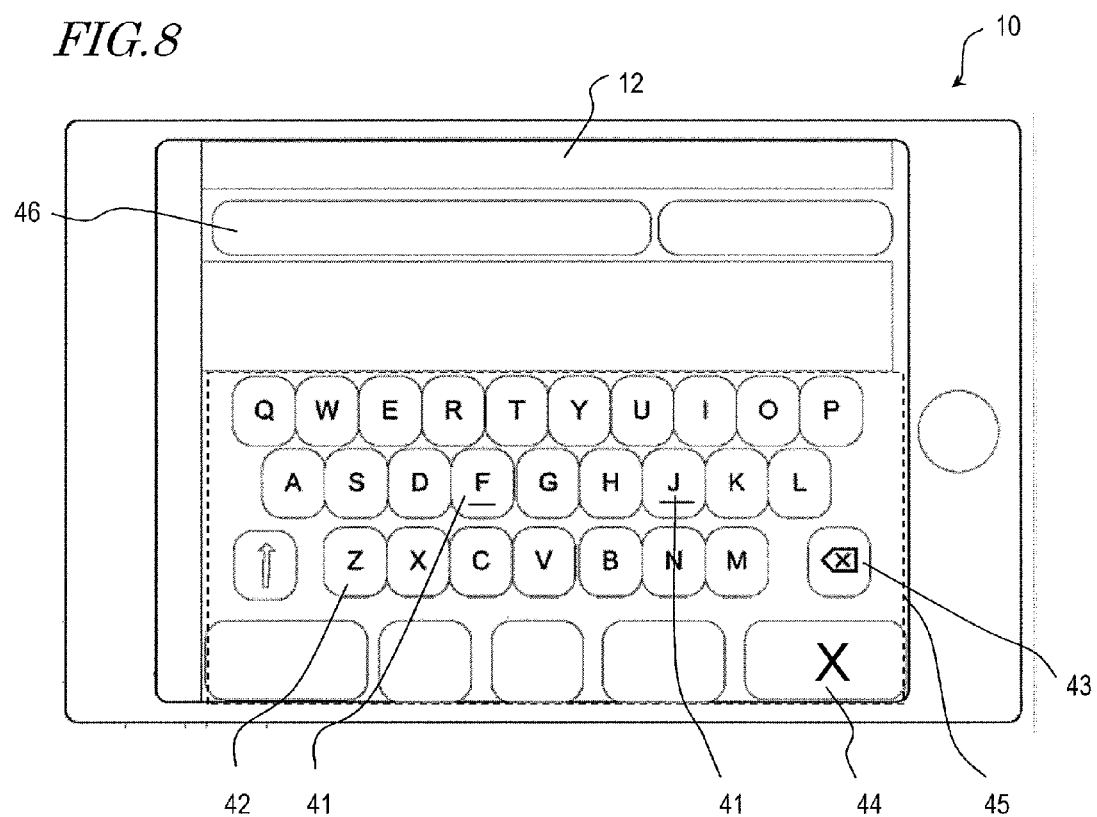

ELECTRONIC DEVICE

This is a continuation of International Application No. PCT/JP2012/000039, with an international filing date of Jan. 5, 2012, which claims priority of Japanese Patent Application No. 2011-022377, filed on Feb. 4, 2011, the contents of which are hereby incorporated by reference.

BACKGROUND

1. Technical Field:

The present disclosure relates to an electronic device which permits touch operation by a user.

2. Description of the Related Art:

In electronic devices having a touch panel disposed on a display screen, techniques of enhancing the user operability are known which involve vibrating the touch panel to provide a tactile sensation for the user. In an electronic device having a touch panel disposed thereon, a so-called software keyboard is often used, which allows text input to be made via a touch on a keyboard that is displayed on the screen. However, since a software keyboard does not present a contoured surface as do actual keyboards, there is a problem in that a reference area(s) on the keyboard (i.e., a home position(s), such as the positions of "F" and "J" on a QWERTY keyboard, or the position of "5" on a numeric keypad) is/are difficult to recognize. In order to solve this problem, Japanese National Phase PCT Laid-Open Publication No. 2009-533762 (hereinafter "Patent Document 1") discloses a technique of presenting tactile sensations, via different vibrations depending on whether a home position key is touched or any key other than the home position key is touched, thus allowing the user to recognize the home position.

SUMMARY

The present disclosure provides an electronic device which can easily perform an input operation that is intended by a user.

An electronic device according to an embodiment comprises: a display section for displaying an operation area including a reference area and a non-reference area; a touch panel provided on a display surface side of the display section; an informing section for informing a user of an operation status of the user; a control section for controlling an operation of the informing section; and a distinction section for distinguishing between a first operation where the user searches for the reference area on the touch panel and a second operation which is a key input operation to the operation area, wherein the control section controls the operation of the informing section based on a result of distinction by the distinction section.

A program according to an embodiment is a program for causing an electronic device to execute an operation of informing a user of an operation status of the user on a touch panel, the program causing the electronic device to execute: a step of distinguishing between a first operation where the user searches for a reference area on the touch panel and a second operation which is a key input operation to the operation area; and a step of controlling an operation of informing the user based on a result of distinction.

According to an embodiment, an operation where a user searches for a reference area on a touch panel is distinguished from a key input operation to an operation area. This prevents an inadvertent key input from being made when a key that is not intended for input is touched. Moreover, by controlling the operation of an informing section based on the result of distinction, the user is able to easily recognize the current operation status.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 8 is a diagram showing an exemplary displayed image on an electronic device according to an embodiment.

DETAILED DESCRIPTION

Figure 1:
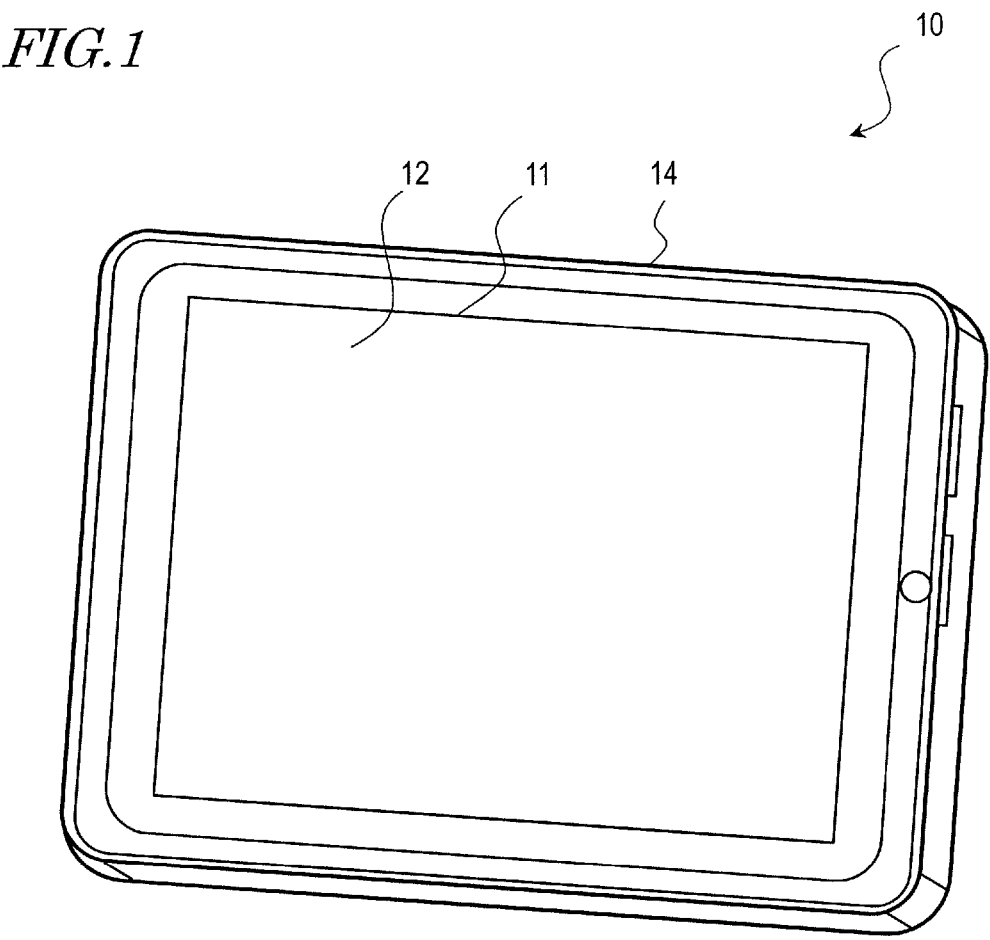
FIG. 1 is a perspective view showing the appearance of an electronic device according to an embodiment.

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

In Patent Document 1, depending on whether the home position key is touched or any key other than the home position key is touched, tactile sensations through different vibrations are presented. However, since any text input on a software keyboard is to be made via a touch, even when the wrong key (that was not intended for the text input) is touched, a character which is designated for that wrong key will be input. For example, during touch-typing on a keyboard, a motion of lightly swiping across the keyboard surface with a finger may be made in search of a home position; however, even such a swiping motion by itself may result in an inadvertent text input. Patent Document 1 fails to disclose anything about making a distinction between a finger-swiping motion in search of a home position and a motion of striking the keyboard for making an input. Therefore, the construction of Patent Document 1 may allow an input operation to inadvertently occur during a motion of searching for a home position, whereby an undesired input may be performed.

The present disclosure provides an electronic device which can easily perform an input operation that is intended by a user.

(Embodiment 1)
<Construction>

Figure 2:
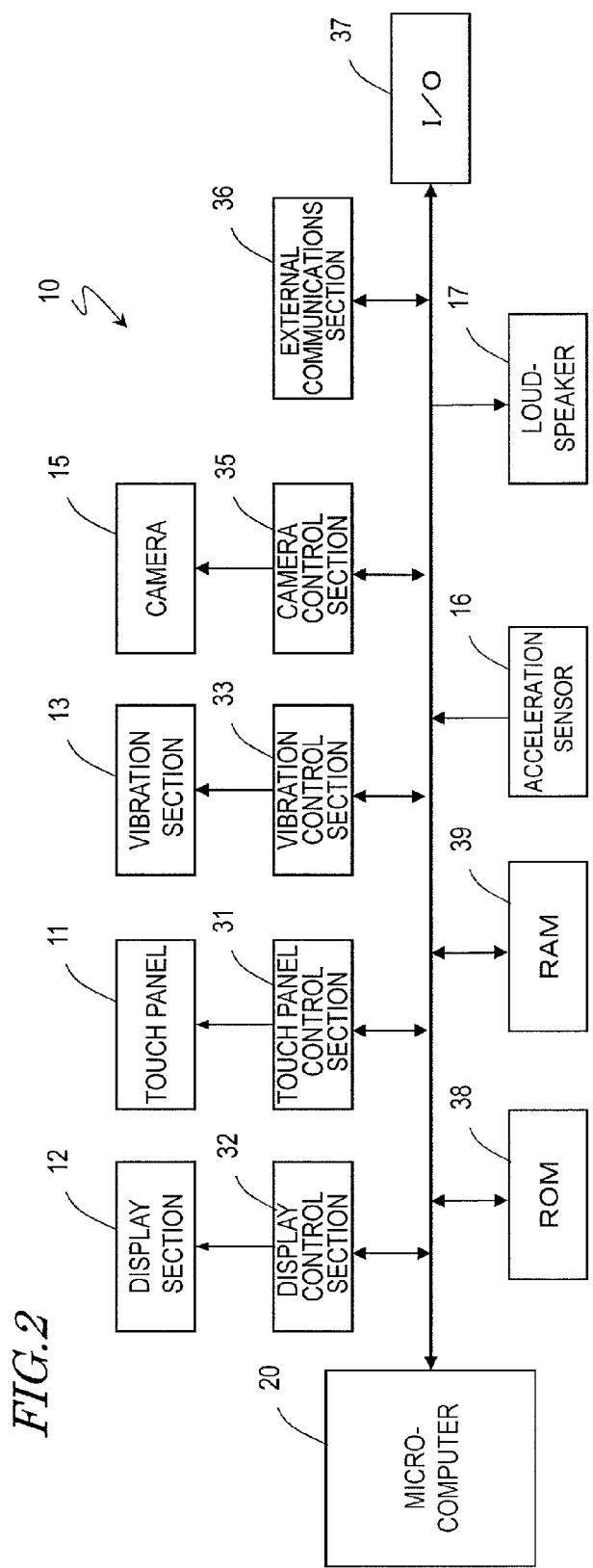
FIG. 2 is a block diagram showing the construction of an electronic device according to an embodiment.
Figure 3:
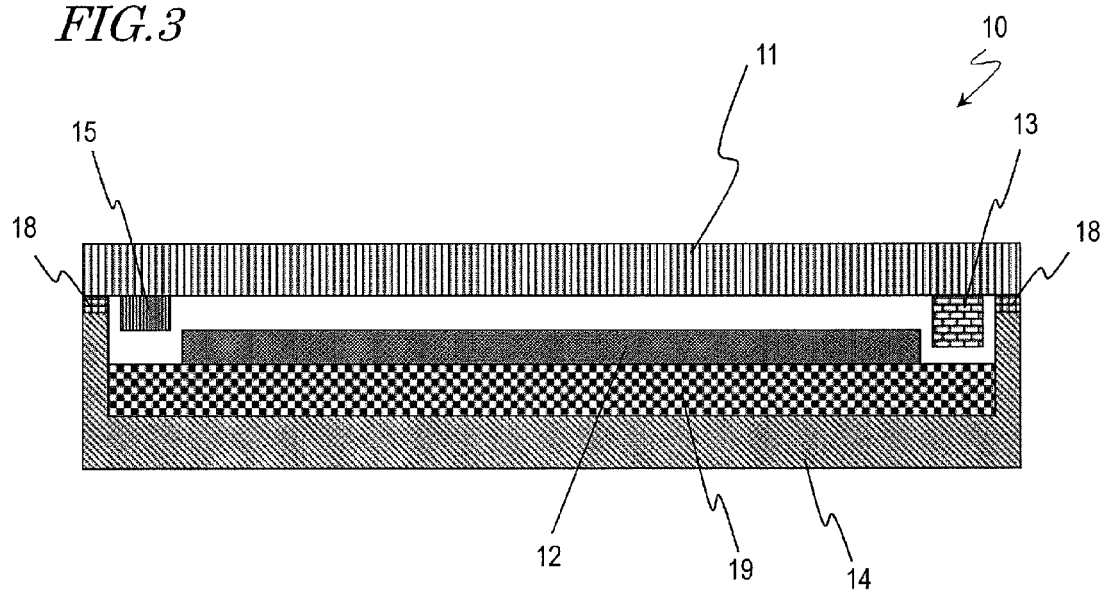
FIG. 3 is a cross-sectional view of an electronic device according to an embodiment.

With reference to FIGS. 1, 2, and 3, the overall construction of an electronic device 10 according to the present embodiment will be described.

FIG. 1 is a perspective view showing the appearance of the electronic device 10. FIG. 2 is a block diagram showing the construction of the electronic device 10.

As shown in FIGS. 1 and 2, the electronic device 10 mainly includes: a display section 12; a touch panel 11 covering the display section 12; a vibration section 13 for vibrating the touch panel 11; a vibration control section 33 for controlling the vibration of the vibration section 13; and an acceleration sensor 16 for measuring any acceleration of the electronic device 10 that may occur in response to a touch operation by a user.

The user operates the electronic device 10 by touching on what is displayed on the display section 12 with a finger, a pen, or the like. A circuit board 19 having various electronic parts mounted thereon, e.g., a microcomputer 20, is disposed in a housing 14.

The display section 12 displays characters, numbers, figures, keyboards, and the like. The display section 12 includes an operation area 45 which is a region that is manipulable by the user. The operation area 45 displays an image of something which accepts an input made by the user, e.g., a keyboard. By performing a touch operation at an arbitrary position on the keyboard which is displayed in the display section 12, the user is able to make a text input, etc. The operation area 45 further includes a reference area(s) and a non-reference area(s), which will be described in detail later. As the display section 12, a display device utilizing any known technique may be used, e.g., liquid crystal, organic EL, electronic paper, or plasma.

The display control section 32 controls the content displayed by the display section 12 based on a control signal which is generated by the microcomputer 20.

The touch panel 11 is disposed on the display surface of the display section 12, so as to at least cover the operation area 45. The user is able to manipulate the electronic device 10 through a touch operation on the touch panel 11 with a finger, a pen, or the like. The touch panel 11 is able to detect a touched position of the user. The information of the user's touched position is sent to the microcomputer 20, via a touch panel control section 31. By using the information of the user's touched position, the microcomputer 20 performs various processes described later.

The touch panel 11 may be a touch panel of, for example, an electrostatic type, a resistive membrane type, an optical type, an ultrasonic-electromagnetic type, etc.

The vibration section 13 vibrates the touch panel 11. The vibration section 13 is an example of a tactile presentation section which provides the user with tactile sensations. The vibration control section 33 controls the vibration pattern of the vibration section 13. The construction of the vibration section 13 and the detailed vibration patterns will be described later.

A camera 15 which is mounted on the electronic device 10 is controlled by a camera control section 35.

An external communications section 36 is a communications means which enables communications over the Internet, communications with a personal computer, and so on, for example.

The acceleration sensor 16 measures an acceleration of the electronic device 10 that occurs in response to a touch operation by the user. Specifically, when the user performs an operation of swiping across the touch panel surface with a finger, little impact is caused by the user's operation on the electronic device 10, so that only a small acceleration is measured by the acceleration sensor 16. On the other hand, when the user inputs a character by touching on an arbitrary character displayed in the operation area 45, the user's finger undergoes a motion of tapping on the touch panel 11. In such a motion, the user's operation causes a substantial impact on the electronic device 10, thus resulting in a substantial acceleration being measured by the acceleration sensor 16. The acceleration sensor 16 is able to measure the acceleration occurring in response to such an operation of the user. The acceleration which has been measured by the acceleration sensor 16 is sent to the microcomputer 20. Based on the magnitude of this acceleration, the microcomputer 20 sends a control signal concerning a vibration pattern to the vibration control section 33. Based on a control signal from the microcomputer 20, the vibration control section 33 vibrates the vibration section 13 in a vibration pattern which is varied in accordance with the magnitude of acceleration.

The acceleration sensor 16 is an example of a distinction section for distinguishing a first operation of the user searching for a reference area on the touch panel 11 from a second operation which is an actual key input operation made to the operation area 45.

Moreover, the electronic device 10 includes a loudspeaker 17 for generating audio and an input/output section 37 of any of various types which is capable of handling input/output from or to various electronic devices.

FIG. 3 is a cross-sectional view of the electronic device 10. The electronic device 10 of the present embodiment is constructed so that the display section 12, the vibration section 13, and the circuit board 19 are accommodated in the housing 14. The microcomputer 20, a RAM 39, a ROM 38, various control sections, a power supply, and the like are disposed on the circuit board 19.

The vibration section 13, which is mounted on the touch panel, vibrates the touch panel 11 so as to allow the user to experience tactile sensations. The touch panel 11 is disposed on the housing 14 via spacers 18, the spacers 18 facilitating transmission of the vibration of the touch panel to the housing 14. The spacers 18 may be cushioning members of silicone rubber, urethane rubber, or the like, for example.

The display section 12 is placed within the housing 14, and the touch panel 11 covers the display section 12. The touch panel 11, the vibration section 13, and the display section 12 are electrically connected to a circuit board.

Figure 4:
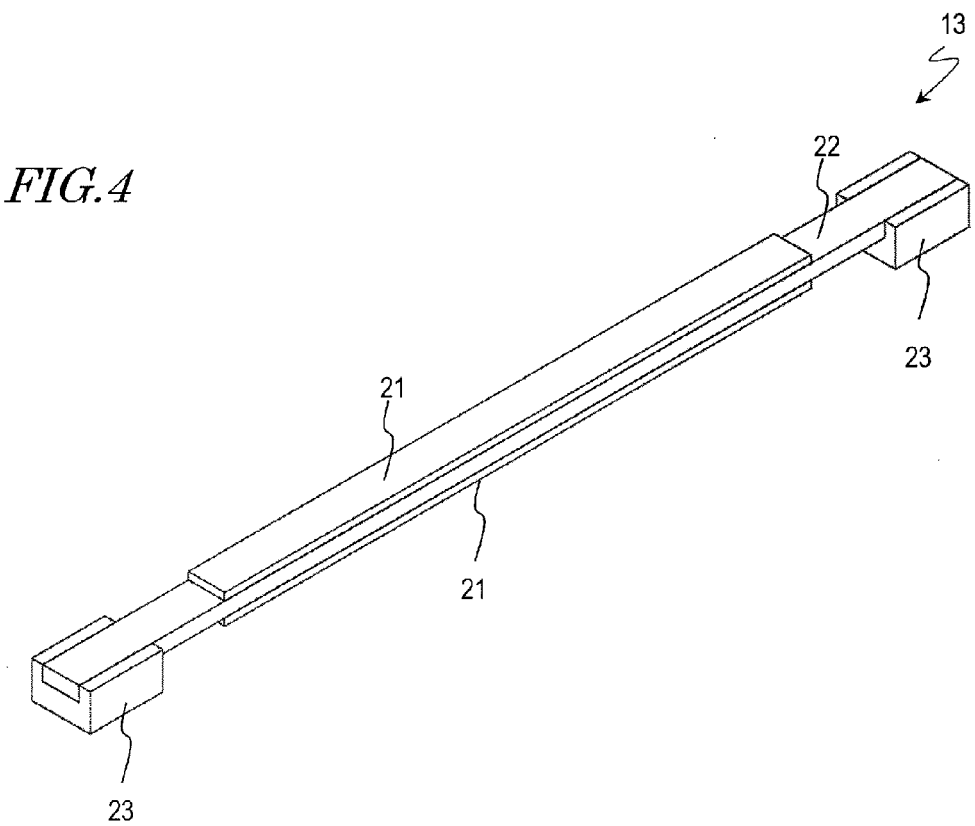
FIG. 4 is a perspective view showing the appearance of a vibration section according to an embodiment.

With reference to FIG. 4, the construction of the vibration section 13 is described. FIG. 4 is a perspective view of the vibration section 13 according to the present embodiment. The vibration section 13 includes piezoelectric elements 21, a shim 22, and bases 23. On both sides of the shim 22, the piezoelectric elements 21 are adhesively bonded. Both ends of the shim 22 are connected to the bases 23, thus realizing a so-called simple beam construction. The bases 23 are connected to the touch panel 11.

The piezoelectric elements 21 are pieces of a piezoelectric ceramic such as lead zirconate titanate or a piezoelectric single crystal such as lithium niobate. With a voltage being applied from the vibration control section 33, the piezoelectric elements 21 expand or contract. By controlling them so that one of the piezoelectric elements 21, attached on both sides of the shim 22, expands while the other shrinks, flexural vibrations are caused in the shim.

The shim 22 is a spring member of e.g. phosphor bronze. By way of the bases 23, the vibration of the shim 22 causes the touch panel 11 to also vibrate, whereby the user operating on the touch panel is able to detect the vibration of the touch panel.

The bases 23 are made of a metal such as aluminum or brass, or a plastic such as PET or PP.

The frequency, amplitude, and period of the vibration are controlled by the vibration control section 33. For example, the frequency of vibration is about 100 to 400 Hz.

Although the present embodiment illustrates that the piezoelectric elements 21 are attached on the shim 22, the piezoelectric elements 21 may be attached directly onto the touch panel 11. Moreover, a thin-film piezoelectric member may be formed on the touch panel 11 by a method such as sputtering, so as to be used as the vibration section 13.

In the case where a cover member or the like exists on the touch panel 11, the piezoelectric elements 21 may be attached on that cover member. Instead of piezoelectric elements 21, a vibration motor may be used.

<Operation>

With reference to FIGS. 5 and 6, and FIGS. 7A and 7B, a text input operation will be described.

Figure 5:
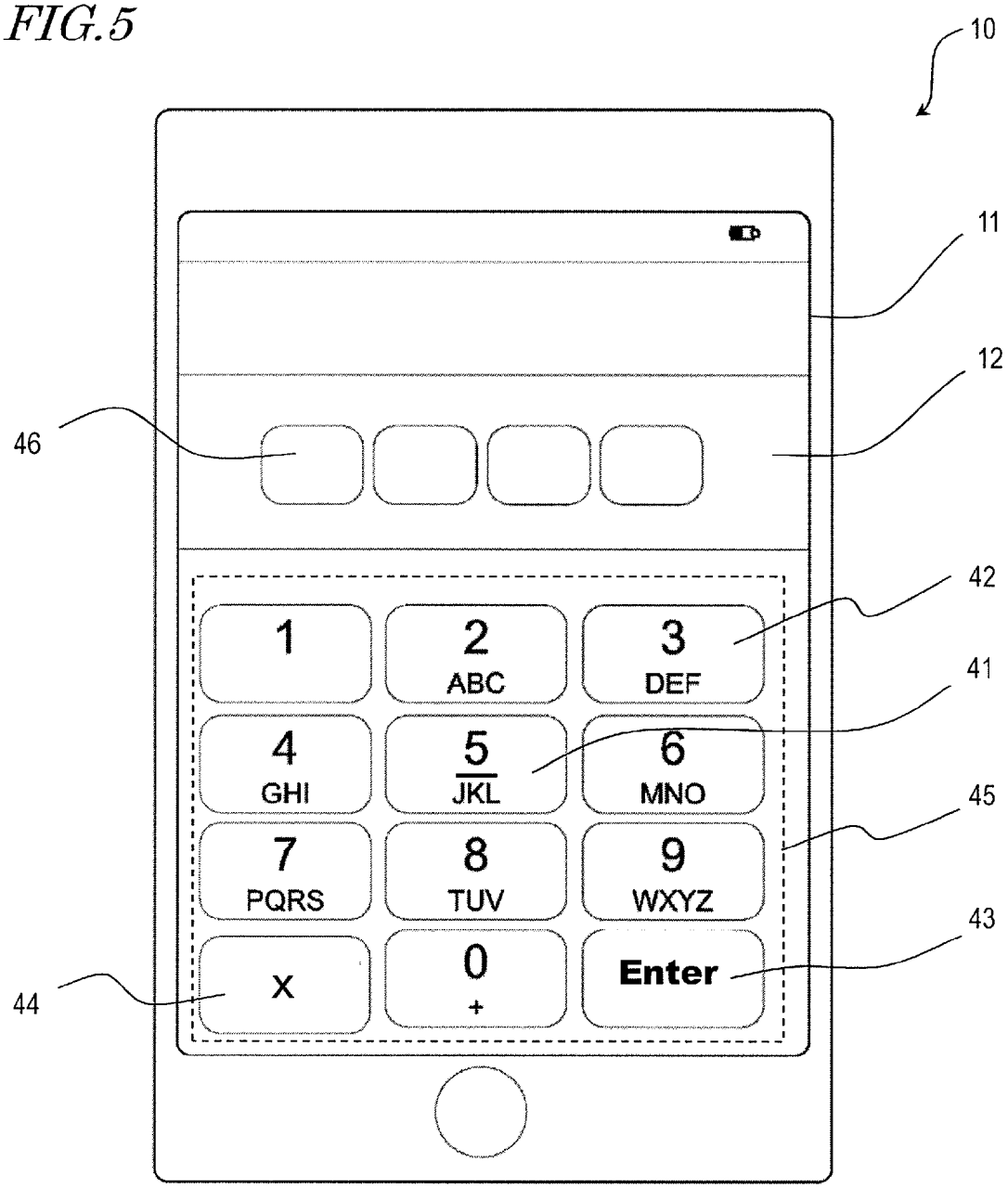
FIG. 5 is a diagram showing an exemplary displayed image of an electronic device according to an embodiment.

FIG. 5 is an exemplary displayed image on the electronic device 10, representing a numeric keypad. By touching on the numeric keypad displayed in the display section 12 of the electronic device 10, the user enters a number, which is then displayed in an input area 46. In the display section 12 are displayed a home position key 41, ordinary keys 42, an ENTER key 43, an END key 44, and the input area 46. An operation area (effective area) 45 defines a region containing the home position key 41, the ordinary keys 42, the ENTER key 43, and the END key 44.

In the case of a numeric keypad, the home position key 41 is the "5" key, which is a key in the central position of the numeric keypad. By first placing a finger at the position of the home position key 41 and then making a number-inputting operation via a stroke on the keyboard, the user is able to achieve number inputting with more ease, without even looking at the numbers on the keyboard. The home position key 41 is exemplary of a reference area, whereas the ordinary keys 42 are exemplary of non-reference areas. When the user searches for the home position key 41 with a finger, the user will perform an operation of swiping across the touch panel 11 with the finger; specifically, this is an operation where the user's touched position gradually changes across the touch panel. Hereinafter, such an operation will be referred to as a "swiping operation".

The ordinary keys 42 are any numeric keys other than the home position key 41. By striking the home position key 41 or an ordinary key 42, the user is able to input a number in the input area 46.

The ENTER key 43 is a key for finalizing what has been input by the user. After a number is input, if the user strikes the ENTER key 43, the number which has been input in the input area 46 is sent as information to the microcomputer 20.

This ends the input operation, after which the electronic device 10 will follow instructions from the microcomputer 20.

The END key 44 is a key for ending the input operation. At any time during the number inputting or after the number inputting, the user is able to end the input operation by striking the END key 44, without allowing numeric information to be sent to the microcomputer 20.

Figure 6:
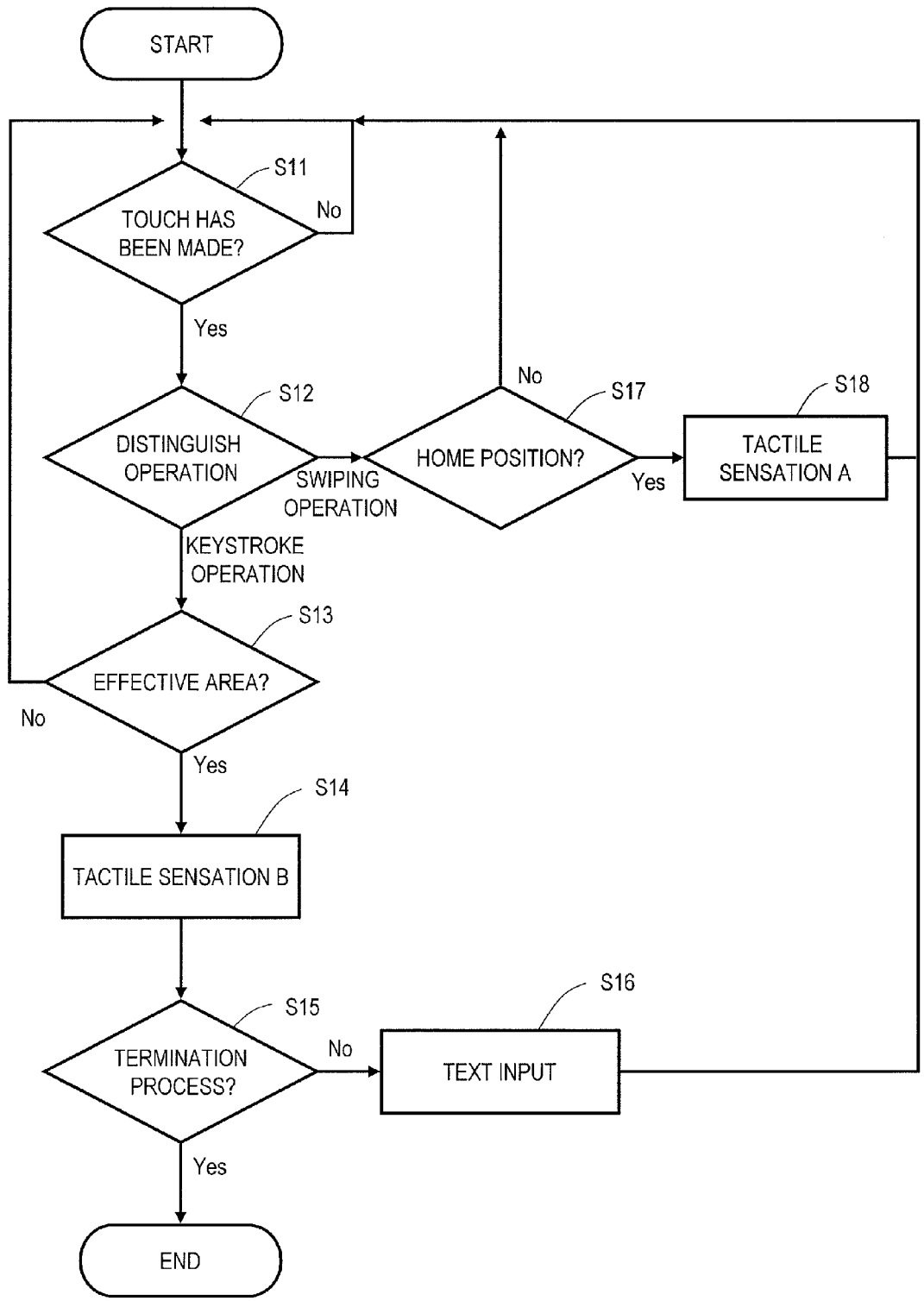
FIG. 6 is a flowchart showing processing by an electronic device according to an embodiment.

FIG. 6 is a flowchart showing a flow of processes of text inputting in the present embodiment, where "S" stands for "step".

After the input operation is started, at S11, it is determined whether the user has touched the touch panel 11. Such a determination is made based on information from the touch panel control section 31. If it is not touched (No from S11), control again waits until a touch occurs.

When S11 finds that the user has made a touch, the microcomputer 20 determines whether the user's touch constitutes a swiping operation or a keystroke operation, based on a result from the distinction section. In the present embodiment, the distinction section is exemplified as the acceleration sensor 16, which senses any acceleration in a perpendicular direction to the display surface of the display section 12. If the acceleration exceeds a certain threshold value, the microcomputer 20 recognizes a keystroke operation; if it is equal to or less than the threshold value, the microcomputer 20 recognizes a swiping operation.

If it is determined at S12 that the touch operation made by the user is a swiping operation, control proceeds to S17. At S17, information of the position on the touch panel 11 which is being swiped on by the user is acquired from the touch panel control section 31, and the microcomputer 20 determines whether the position is on the home position key 41 or not.

If it is determined that the position being swiped on by the user is on the home position key 41 (Yes from S17), control proceeds to S18. At S18, the vibration control section 33 controls the vibration section 13 to present tactile sensation A to the user. By feeling tactile sensation A through the touching finger, the user is able to know that the finger is on the home position key 41.

If it is determined that the position being swiped on by the user is not on the home position key 41 (No from S17), control returns to S11 to wait for a touch operation to occur.

On the other hand, if it is determined by the distinction section at S12 that the user's touch constitutes a keystroke operation, control proceeds to S13. At S13, based on information from the touch panel control section 31, the microcomputer 20 determines whether the position of the user's keystroke is within the operation area 45. If it is determined that the user has struck anywhere other than the operation area 45, control returns to S11 to again wait until a touch occurs.

If it is determined at S13 that the user has struck the operation area 45, control proceeds to S14. At S14, the vibration control section 33 controls the vibration section 13 to present tactile sensation B to the user. By feeling tactile sensation B through the touching finger, the user is able to know that a text input or a termination process has been made.

Thereafter, at S15, based on information from the touch panel control section 31, it is determined whether the input operation has been ended or not. Specifically, it is determined whether the position of the user's keystroke is at the END key 44 or the ENTER key 43. If the position of the user's keystroke is at the END key 44, the input operation is ended. On the other hand, if the position of the user's keystroke is at the ENTER key 43, the information which has been input to the input area 46 is sent to the microcomputer 20, and thereafter the input operation is ended.

If the position of the keystroke is not at the END key 44 or the ENTER key 43 (No from S15), control proceeds to S16. At S16, a text input operation of causing a number which is indicated at the struck position to be displayed in the input area 46 is performed, and control returns to S11 to wait for a next touch operation.

Figure 7A:
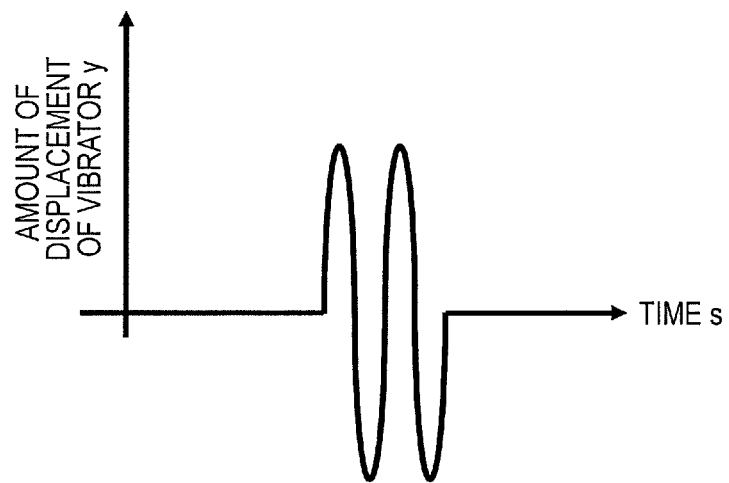
FIGS. 7A and 7B are diagrams showing vibration patterns according to an embodiment.
Figure 7B:
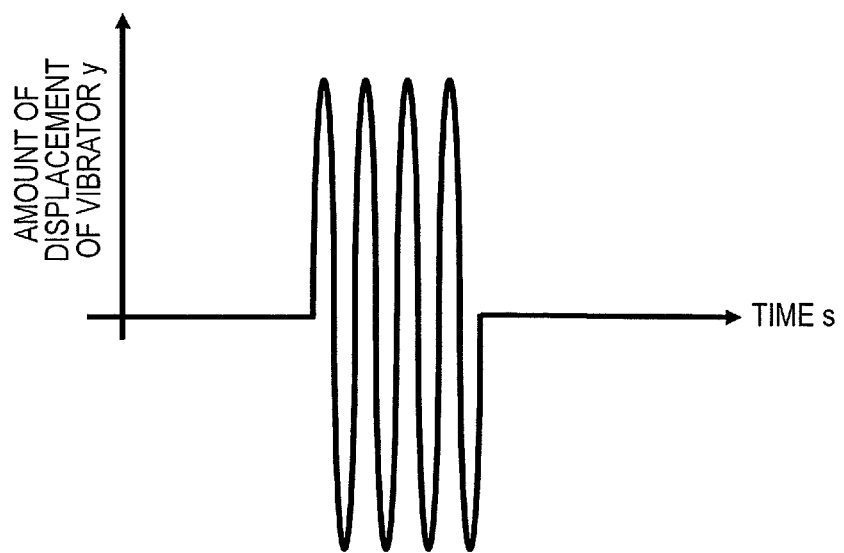

FIGS. 7A and 7B are schematic illustrations of exemplary vibration patterns according to Embodiment 1.

Based on an instruction from the microcomputer 20, the vibration control section 33 applies a voltage of a waveform as shown in FIG. 7A to the vibration section 13 so as to vibrate the touch panel 11, thereby presenting tactile sensation A to the user. As an example, the voltage for presenting tactile sensation A may be a sine wave of 150 Hz, 70 Vrms, 2 cycles. In this case, there is about a 5 μm amplitude on the touch panel 11. Alternatively, the vibration control section 33 applies a voltage as shown in FIG. 7B to the vibration section 13 so as to vibrate the touch panel 11, thereby presenting tactile sensation B to the user. As an example, the voltage for presenting tactile sensation B may be a sine wave of 300 Hz, 100 Vrms, 4 cycles. The frequency, voltage, and number of cycles are only exemplary; another waveform such as a rectangular wave or a sawtooth wave, an intermittent waveform, a waveform with gradually changing frequency or amplitude, etc., may also be used.

Although the present embodiment illustrates that the vibration pattern for presenting tactile sensation A and the vibration pattern for presenting tactile sensation B are distinct vibration patterns, this is not a. limitation. The vibration patterns of tactile sensation A and tactile sensation B may be identical:

(Embodiment 2)

Hereinafter, an electronic device according to Embodiment 2 will be described. Since the electronic device of Embodiment 2 is similar in construction to the electronic device of Embodiment 1 described above, any repetitive description will be omitted, and the differences from Embodiment 1 will be described.

<Operation>

With reference to FIGS. 8, 9, 10, and 11, a text input operation of the electronic device 10 of Embodiment 2 will be described.

FIG. 8 shows an exemplary displayed image on the electronic device 10, where QWERTY keys are displayed in the display section 12. By touching the QWERTY keys indicated in the display section 12 of the electronic device 10, the user inputs characters to the input area 46, which become displayed. In the display section 12 are displayed home position keys 41, ordinary keys 42, an ENTER key 43, an END key 44, and the input area 46. The operation area 45 defines a region containing the home position keys 41, the ordinary keys 42, the ENTER key 43, and the END key 44.

In the case of the QWERTY keys, the home position keys 41 are two keys near the middle of the QWERTY keys, i.e., the "F" key and the "J" key. By first placing the index fingers of both hands at the positions of these home position keys and then making a character-inputting operation via a stroke on the keyboard, the user is able to achieve text inputting with more ease, without even looking at the characters on the keyboard. When determining that the user has recognized the home position keys 41, the microcomputer 20 enables an input mode. As a result, text inputting via the user's strokes is enabled, whereby text input is received. Thereafter, when the user has not touched the keyboard for a predetermined period, the microcomputer 20 determines that the user does not recognize the home position keys 41, and disables the input mode. As a result, text inputting via the user's strokes is disabled, whereby text input is no longer received.

The ordinary keys 42 are any character keys other than the home position keys 41. By striking a home position key 41 or an ordinary key 42, the user is able to input a character to the input area 46.

The ENTER key 43 is a key for finalization. When the user strikes the ENTER key 43 after making a text input, a character which is input to the input area 46 is sent as information to the microcomputer 20. In that case, the input operation is ended, and the electronic device 10 follows instructions from the microcomputer 20.

The END key 44 is a key which ends an input operation. At any time during the text inputting or after the text inputting, by striking the END key 44, the user is able to end the input operation, without allowing text information to the microcomputer 20.

Figure 9:
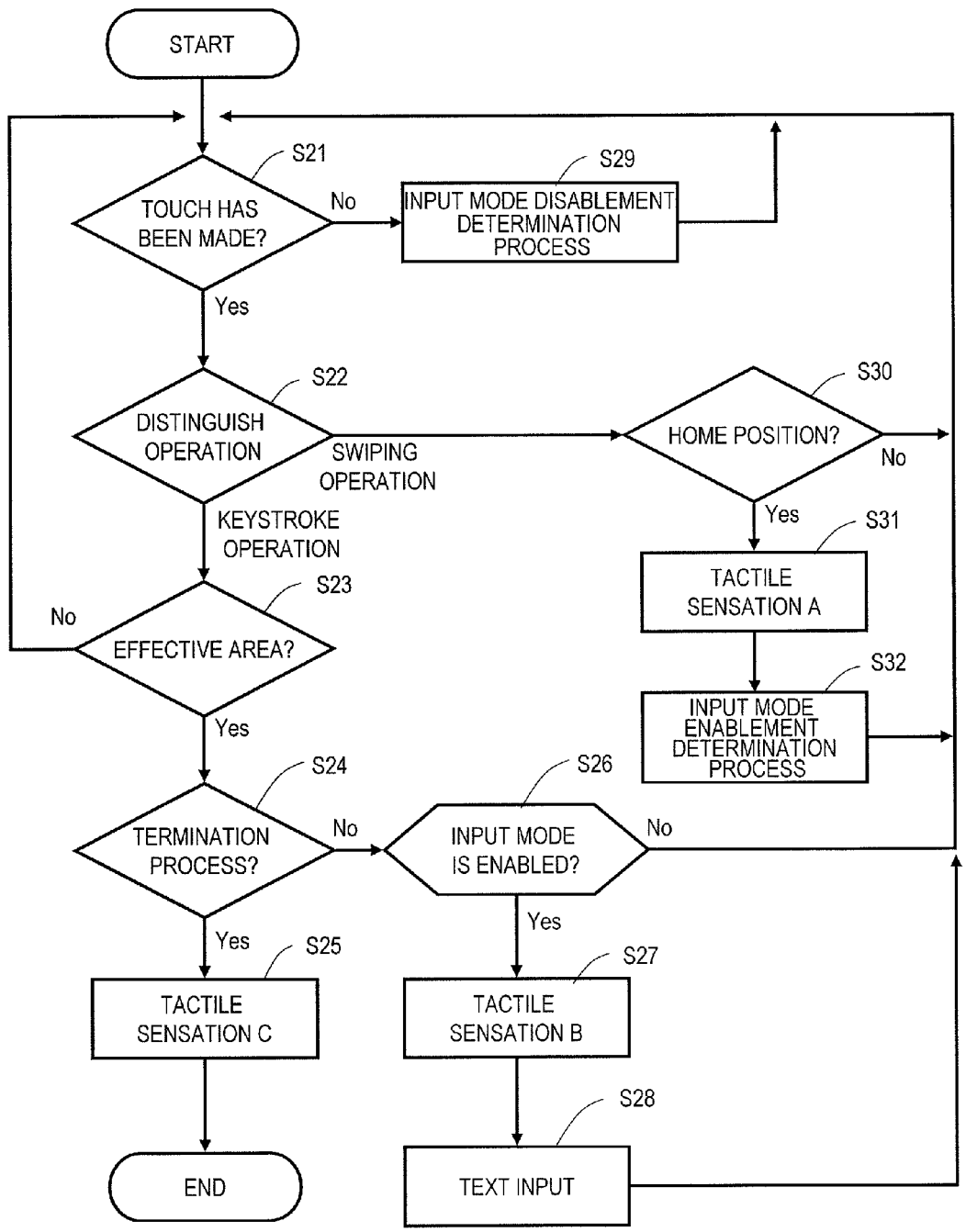
FIG. 9 is a flowchart showing processing by an electronic device according to an embodiment.

FIG. 9 is a flowchart showing a text input process according to the present embodiment, where "S" stands for "step".

After an input operation is started, at S21, it is determined whether the user has touched the touch panel 11. Such a determination is made based on information from the touch panel control section 31. If it is not touched (No from S21), control proceeds to S29. After an input mode disablement determination process is performed at S29, control again waits until a touch occurs at S21. The input mode disablement determination process will be described later.

When S21 finds that the user has made a touch, control proceeds to S22. At S22, the microcomputer 20 determines whether the user's touch constitutes a swiping operation or a keystroke operation based on a result from the distinction section. In the present embodiment, the distinction section is exemplified as the acceleration sensor 16, which senses any acceleration in a perpendicular direction to the display surface of the display section 12. If the acceleration exceeds a certain threshold value, the microcomputer 20 recognizes a keystroke operation; if it is equal to or less than the threshold value, the microcomputer 20 recognizes a swiping operation.

If it is determined at S22 that the touch operation by the user is a swiping operation, control proceeds to S30. At S30, information of the position on the touch panel 11 which is being swiped on by the user is acquired from the touch panel control section 31, and it is determined whether the position is on either home position key 41.

If it is determined that the position being swiped on by the user is on a home position key 41 (Yes from S30), control proceeds to S31. At S31, the vibration control section 33 controls the vibration section 13 to present tactile sensation A to the user. By feeling tactile sensation A through the touching finger, the user is able to know that the finger is on a home position key 41. Thereafter, an input mode enablement determination process is performed at S32, and control returns to S21. The input mode enablement determination process will be described later.

If it is determined that the position being swiped on by the user is not on either home position key 41 (No from S30), control returns to S21 to wait for a touch operation to be recognized.

On the other hand, if it is determined by the distinction section at S22 that the user's touch constitutes a keystroke operation, control proceeds to S23. At S23, based on information from the touch panel control section 31, it is determined whether the position of the user's keystroke is within the operation area 45. If it is determined that the user has struck anywhere other than the operation area 45, control returns to S11 to again wait until a touch occurs.

If it is determined at S23 that the user has struck the operation area 45, control proceeds to S24. At S24, based on information from the touch panel control section 31, it is determined whether the position of the user's keystroke is on the END key 44 or the ENTER key 43.

If it is determined that the position of the keystroke is on the END key 44 or the ENTER key 43, control proceeds to S25. At S25, the vibration control section 33 controls the vibration section 13 to present tactile sensation C to the user. By feeling tactile sensation C through the touching finger, the user is able to know that a termination process or a finalization of text input has been performed. Thereafter, if the position of the user's keystroke is on the END key 44, the process is ended. If the position of the user's keystroke is on the ENTER key 43, input information in the input area 46 is sent to the microcomputer 20, and thereafter the process is ended.

At S24, if the position of the user's keystroke is not on the END key 33 or the ENTER key 43, it is determined whether the input mode is enabled or not at S26. If it is determined that the input mode is enabled (Yes from S26), control proceeds to S27. At S27, the vibration control section 33 controls the vibration section 13 to present tactile sensation B to the user. By feeling tactile sensation B through the touching finger, the user is able to know that a text input has been made. Then, at S28, a character which is indicated at the struck position is displayed in the input area 46, and control returns to S21 to wait until a next touch.

If it is determined at S26 that the input mode is not enabled (No from S26), control returns to S21 to wait for a next touch.

For example, at the timing when the operation area 45 (QWERTY keys) is first activated for making a text input, the input mode is disabled, thus making any key input (text input) invalid. In this manner, no text input will be made even if a finger touches an ordinary key 42 before reaching a home position; therefore, the user is prevented from making any unintended text input.

Moreover, even if the input mode is enabled, by disabling text input during any period in which a swiping operation is being made, the user is prevented from making any unintended text input even if he or she makes a swiping operation of moving a finger back to a home position in the middle of a character input operation.

Figure 10:
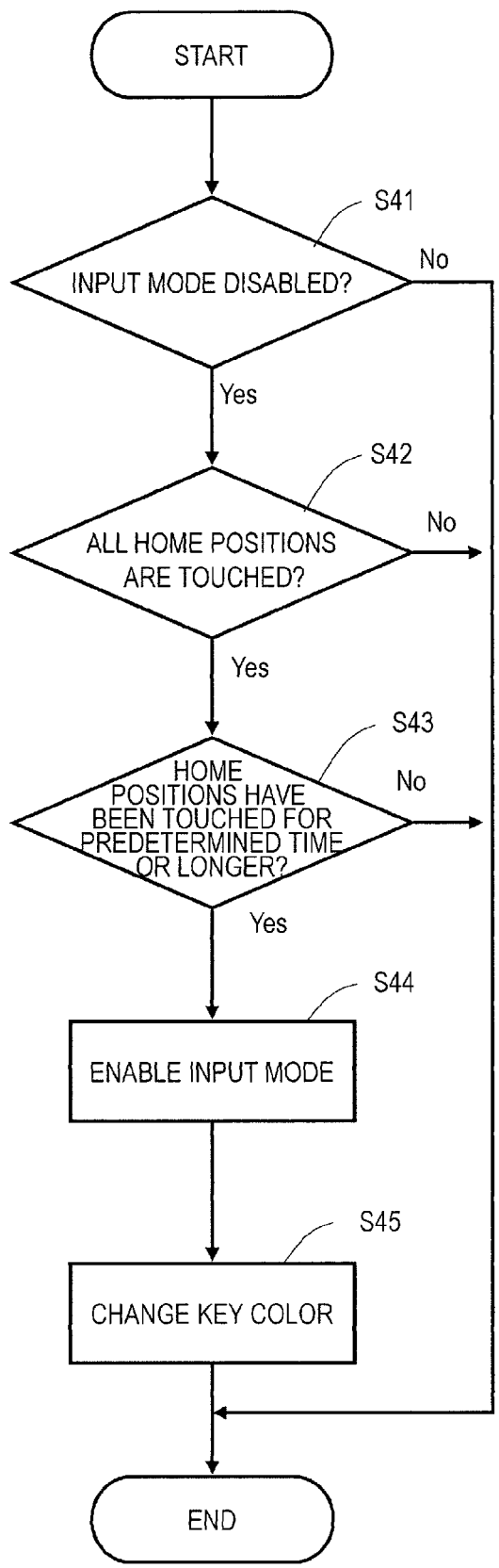
FIG. 10 is a flowchart showing processing by an electronic device according to an embodiment.

FIG. 10 is a flowchart showing the input mode enablement determination process to be performed at S32.

At S41, it is determined whether the current input mode is enabled or disabled. The information as to whether the input mode is enabled or disabled is stored in the RAM 39. If the current input mode is enabled (No from S41), the input mode enablement determination process is ended.

If the current input mode is disabled (Yes from S41), control proceeds to S42. At S42, it is determined whether all home position keys 41 are being touched by the user. Here, the microcomputer 20 may determine that both index fingers of the user have recognized "F" and "J" of the QWERY keys. If it is determined at S42 that the user is touching all home position keys 41 (Yes from S42), control proceeds to S43. If it is determined at S42 that all home position keys 41 are not being touched (No from S42), the input mode enablement determination process is ended.

At S43, it is determined whether the duration for which the user's touched positions have remained on the home position keys 41, as stored in the RAM 39, is equal to or longer than a predetermined time. The predetermined time is approximately 0.1 s to 2.0 s. If the user has been touching the home position keys 41 for the predetermined time or longer, the microcomputer 20 determines that the user has recognized the home position keys 41. In order to determine whether the user's touches have remained on the home position keys 41 for the predetermined time or longer, the duration for which the home position keys 41 have been touched may be stored to the RAM 39 at S30.

If it is determined at S43 that the user has not been touching the home position keys 41 for the predetermined time or longer (No from S43), the input mode enablement determination process is ended.

If it is determined at S43 that the user has been touching the home position keys 41 for the predetermined time or longer (Yes from S43), at S44, the input mode is enabled and the fact that the input mode is enabled is stored to the RAM 39. Then, the keyboard color is changed at S45 to visually indicate that the input mode is now enabled, and the input mode enablement determination process is ended.

Note that it would even be better to indicate the change in input mode through an auditory or tactile sensation or the like, in addition to a visual change.

Alternatively, the input mode may become enabled when the user lifts the fingers off the home position keys 41 after having touched the home position keys 41 for the predetermined time or longer. This prevents the touched keys from being inadvertently input at the moment when the input mode switches from disabled to enabled.

Figure 11:
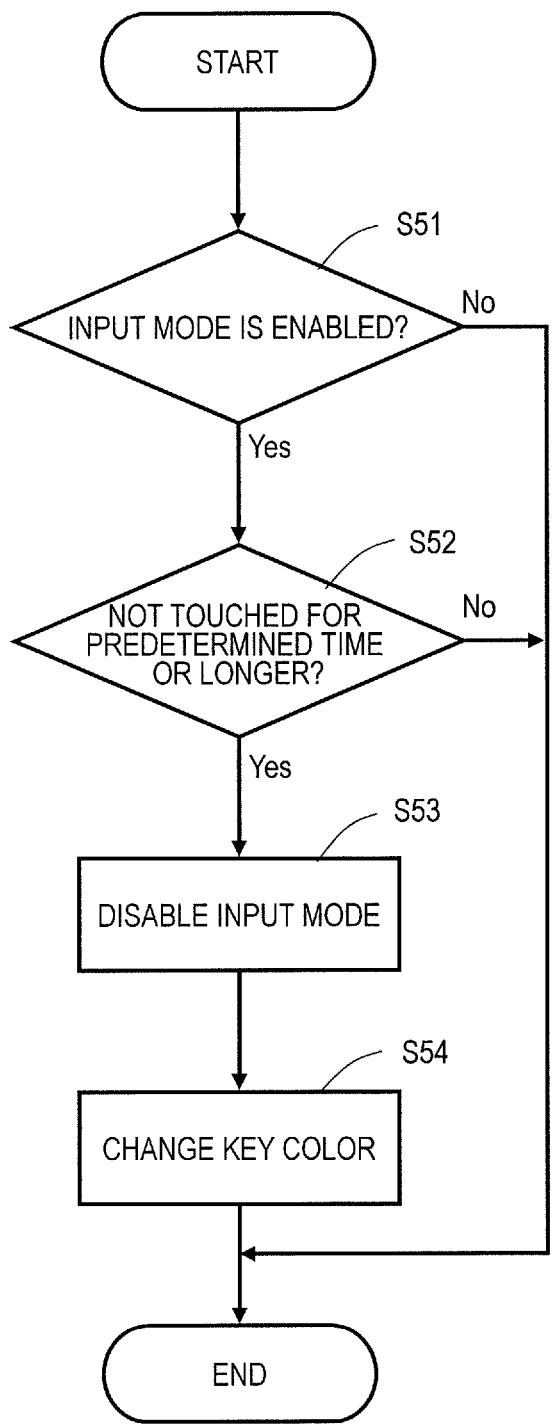
FIG. 11 is a flowchart showing processing by an electronic device according to an embodiment.

FIG. 11 is a flowchart showing the input mode disablement determination process at S29 (FIG. 9).

At S51, it is determined whether the current input mode is enabled or disabled. The information as to whether the input mode is enabled or disabled is stored in the RAM 39. If the current input mode is disabled, the input mode disablement determination process is ended.

If the current input mode is enabled, control proceeds to S52. At S52, it is determined whether the duration for which the user has not been touching the operation area 45 is equal to or longer than a predetermined time. The duration for which the user has not been touching the operation area 45 is stored in the RAM 39. The predetermined time is approximately 1 s to 10 s. If the user has not been touching the operation area 45 for the predetermined time or longer, the microcomputer 20 determines that the user does not recognize the positions of the home position keys 41. In order to be able to determine that the user has not been touching the operation area 45 for the predetermined time or longer, the duration for which the user has not been touching the operation area 45 may be stored to the RAM 39 at S21.

If it is determined at S52 that the duration for which the user has not been touching the operation area 45 is less than the predetermined time (No from S52), the input mode disablement determination process is ended.

If it is determined at S52 that the duration for which the user has not been touching the operation area 45 is equal to or longer than the predetermined time (Yes from S52), the input mode is disabled at S53, and the fact that the input mode is disabled is stored to the RAM 39. Then, the keyboard color is changed at S54 to visually indicate that the input mode is now disabled, and the input mode disablement determination process is ended.

In addition to a visual change, the change in input mode may be indicated through an auditory or tactile sensation or the like.

(Embodiment 3)

Next, an electronic device according to Embodiment 3 will be described. The electronic device 10 of Embodiment 3 differs from the electronic device 10 of Embodiment 1 in that vibration is generated even while a user is touching a button that is not in the home position (which exemplifies a non-reference area) in order to search for the home position (which exemplifies a reference area). Otherwise, the electronic device 10 of Embodiment 3 is similar in terms of construction and processing to the electronic device 10 of Embodiment 1, any repetitive description will be omitted, and the differences from the electronic device 10 of Embodiment 1 will be described.

Figure 13:
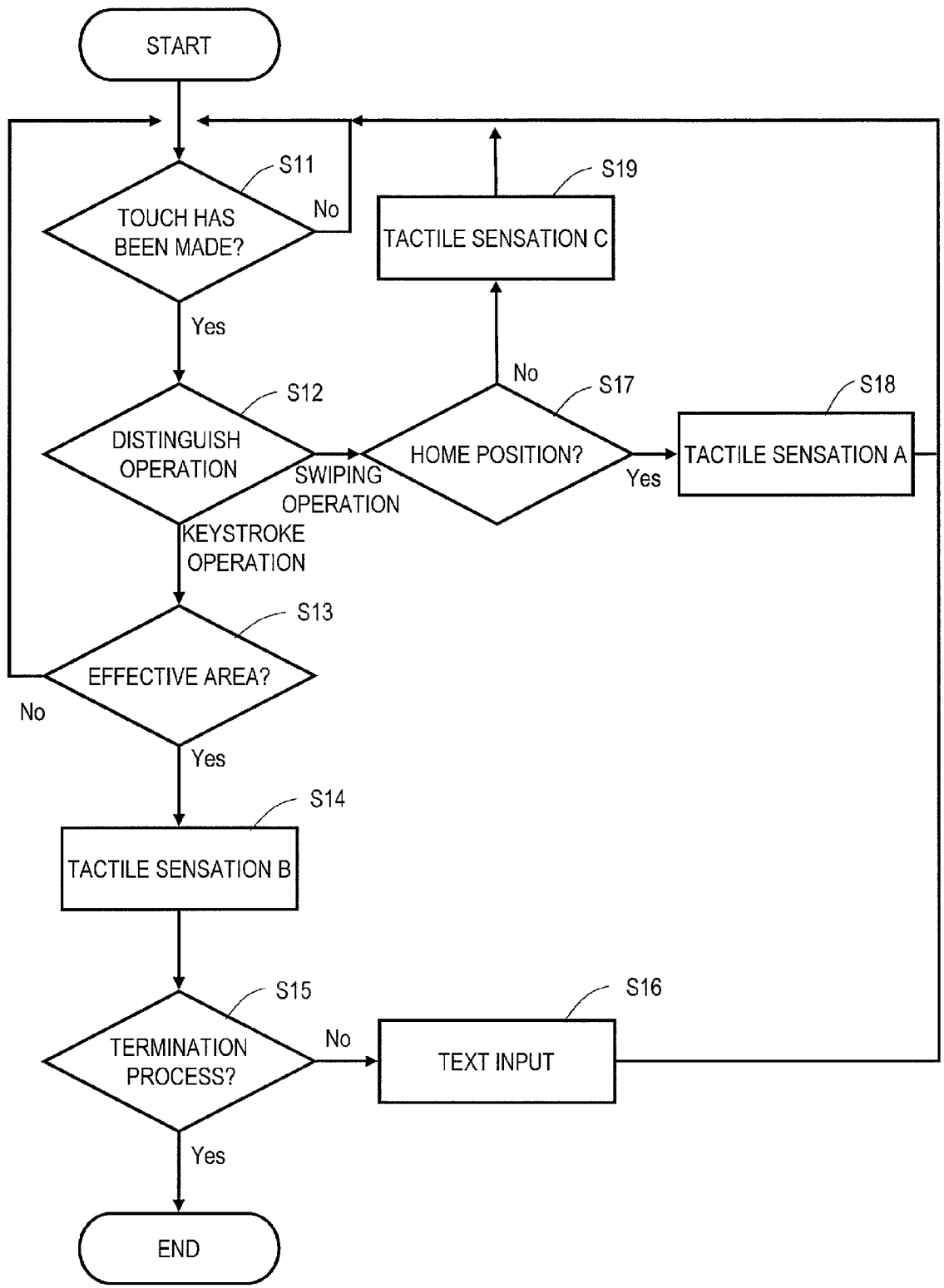
FIG. 13 is a flowchart showing processing by an electronic device according to an embodiment.

FIG. 13 is a flowchart showing processing by the electronic device 10 of Embodiment 3. At S17, if the user is not touching the home position (No from S17), control proceeds to S19. At S19, the vibration control section 33 controls the vibration section 13 to present tactile sensation C to the user. At S17, if the user is touching the home position (Yes from S17), tactile sensation A is presented similarly to Embodiment 1.

When the user makes a swiping operation in order to search for a home position, the user is able to feel different tactile sensations depending on whether the home position is touched or anywhere other than the home position is touched. As a result, the user is able to know whether he or she has touched the home position or not. Moreover, tactile sensation C presented to the user when the user touches anywhere other than the home position allows the user to realize that he or she is still searching for the home position.

The vibration pattern of tactile sensation C may be set as appropriate. For differentiation of vibration patterns, the cycle, amplitude, or the like of the vibration may be altered, which will allow the user to feel a stronger or weaker vibration.

The vibration patterns for tactile sensation A, tactile sensation B, and tactile sensation C may take any of the following combinations.

<Pattern 1: A=B≠C>

The vibration pattern of tactile sensation A and the vibration pattern of tactile sensation B may be identical, while the vibration pattern of tactile sensation A (=tactile sensation B) and the vibration pattern of tactile sensation C are differentiated. This allows the user to realize that he or she is making an operation of searching for the home position.

<Pattern 2: A=C≠B>

The vibration pattern of tactile sensation A and the vibration pattern of tactile sensation C may be identical, while the vibration pattern of tactile sensation A (=tactile sensation C) and the vibration pattern of tactile sensation B are differentiated. This allows the user to know whether he or she is searching for the home position or making a character input operation.

<Pattern 3: A≠B=C>

The vibration pattern of tactile sensation B and the vibration pattern of tactile sensation C may be identical, while the vibration pattern of tactile sensation B (=tactile sensation C) and the vibration pattern of tactile sensation A are differentiated. This allows the user to realize that he or she has found a home position.

<Pattern 4: A≠B≠C>

The vibration pattern of tactile sensation A, the vibration pattern of tactile sensation B, and the vibration pattern of tactile sensation C may all be an identical vibration pattern. This allows the user to know which operation he or she is making.

<Summary of Embodiments>

Thus, an electronic device 10 according to an embodiment includes a display section 12, a touch panel 11, a vibration section 13, a vibration control section 33, and an acceleration sensor 16.

The display section 12 displays an operation area 45, which contains a home position key 41 an example of a reference area and ordinary keys 42 as examples of non-reference areas.

The touch panel 11 is disposed so as to at least cover the operation area 45.

The vibration section 13, which is an example of an informing section, informs the user of an operation status of the user.

The vibration control section 33, which is an example of a control section, controls the vibration section 13.

The acceleration sensor 16, which is an example of a distinction section, distinguishes between a first operation where the user searches for a reference area on the touch panel 11 and a second operation which is a key input operation made to the operation area 45.

Then, based on a result of detection by the acceleration sensor 16, the vibration control section 33 controls the vibration section 13.

In the electronic device 10 with such a construction, a user's operation is distinguished by the acceleration sensor 16, and a corresponding vibration is presented to the user. This allows the user to know which operation he or she has made, or whether his or her operation has been recognized by the electronic device 10. As a result, the user is able to easily make an input to the electronic device 10.

The electronic device 10 according to an embodiment includes a display section 12, a touch panel 11, a touch panel control section 31, and a microcomputer 20, which is an example of a control section.

The display section 12 displays an operation area 45, which contains home position keys 41 as examples of reference areas and ordinary keys 42 as examples of non-reference areas.

The touch panel 11 is disposed so as to at least cover the operation area 45.

The touch panel control section 31 is able to distinguish whether user has touched the home position keys (exemplifying reference areas) or the ordinary keys 42 (exemplifying non-reference areas).

If the user has touched the home position(s) 41, the microcomputer 20 enables user input to the touch panel 11.

Based on this construction of the electronic device 10, when the user makes an operation of searching for the home position(s) 41, inadvertent key inputs are prevented from being made to the electronic device 10. As a result, the user is able to easily make an input to the electronic device 10.

The above-described operation of the electronic device 10 may be implemented in hardware or software. A program for realizing such a control operation may be stored in an internal memory of the microcomputer 20 or a ROM 38. Moreover, such a computer program may be installed to the electrical device 10 from a storage medium (an optical disk, a semiconductor memory, etc.) on which it is recorded, or downloaded via telecommunication lines such as the Internet.

(Other Embodiments)

Although Embodiments 1 to 3 have been illustrated as embodiments of the present disclosure, the embodiments are not limited thereto. For example, the following embodiment also falls within the present disclosure.

The informing section is not limited to the vibration section 13. For example, the informing section may be a loudspeaker 17 which provides information to the user in the form of an audio. Alternatively, the informing section may be of a construction such that information is provided to the user in the form of light. Such a construction can be realized by the display control section 32 controlling the display section 12, for example. Alternatively, the informing section may be of a construction such that information is provided to the user in the form of heat or an electric shock.

Figure 12:
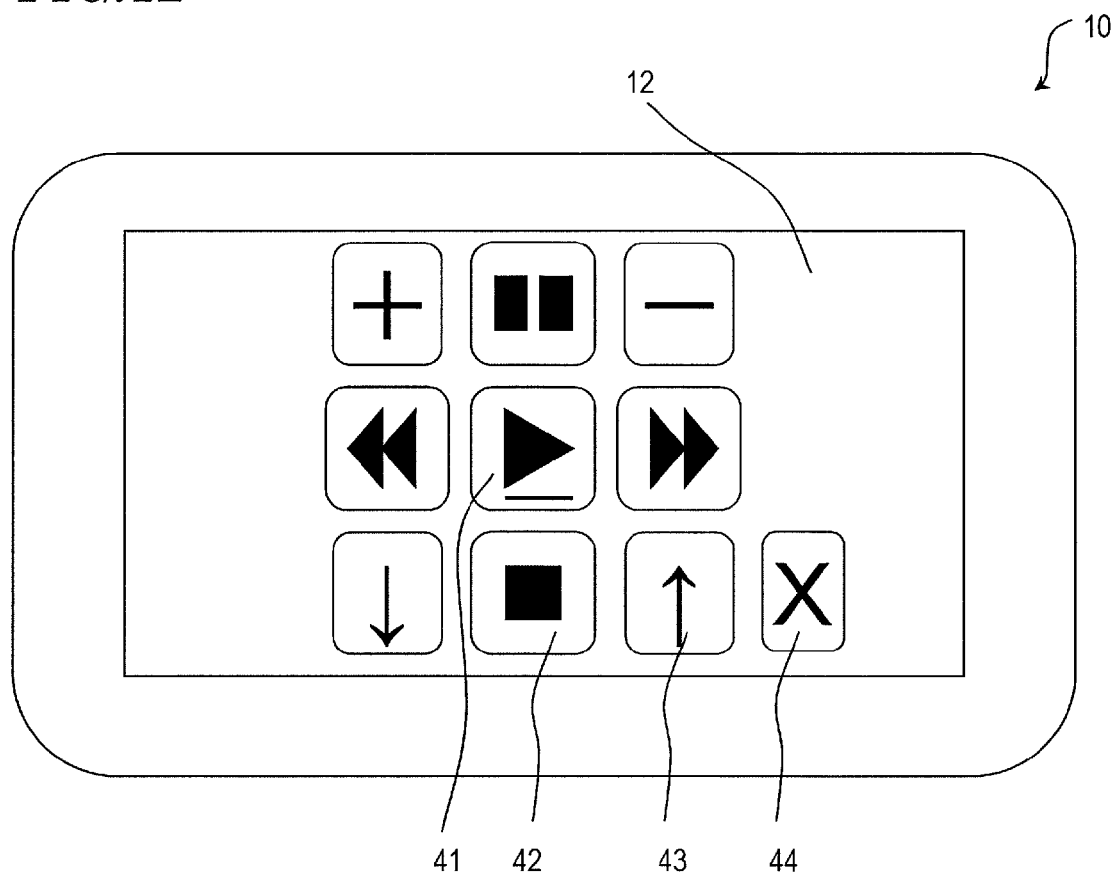
FIG. 12 is a diagram showing an exemplary displayed image on an electronic device according to an embodiment.

FIG. 12 shows an exemplary displayed image on the electronic device 10, which indicates operation keys of a car navigation system, a car radio, or the like. By touching the operation keys displayed in the display section 12 of the electronic device 10, the user is able to manipulate the car navigation system, the car radio, or the like. In the display section 12, a home position key 41, ordinary keys 42, an ENTER key 43, and an END key 44 are indicated. The operation area defines a region containing the home position key 41, the ordinary keys 42, the ENTER key 43, and the END key 44.

Without looking at the touch panel, the user may search for the home position key 41 through a swiping operation, infer the positions of various operation keys based on relative positions therefrom, and select an ordinary key through a keystroke operation, whereby the user can play, stop, or turn up or down the sound volume of music or video information, or change channels, etc.

The distinction section is not limited to the acceleration sensor 16. For example, since the vibration section 13 is a vibrator incorporating the piezoelectric elements 21, the vibration of the piezoelectric elements 21 may be converted into a voltage through piezoelectric effects, this voltage being supplied to the vibration control section 33. By adding a voltage detection function to the vibration control section 33, the user's keystroke operation is converted by the vibration section 13 into a voltage, which is then output to the vibration control section 33. Based on the information of the voltage which is output from the vibration section 13 to the vibration control section 33, the microcomputer 20 is able to recognize that the user has made a keystroke operation.

The determination as to whether the user's operation is a keystroke operation or a swiping operation may also be made by the touch panel control section 31. For example, in the case where the touch panel 11 is a resistive membrane type, the area of contact between the upper and lower layers can be known from a resistance value; from the rate of temporal change in this area of contact, a swiping operation can be distinguished from a keystroke operation, or vice versa.

In the case where the touch panel 11 is an electrostatic type, too, the area of contact between the user's finger and the touch panel 11, or whether the user's finger has approached the touch panel 11 or not, can be recognized as a change in electrostatic capacity. Based on such changes in electrostatic capacity, a swiping operation can be distinguished from a keystroke operation, or vice versa. Specifically, a small change in electrostatic capacity occurs in a swiping operation, whereas a large change in electrostatic capacity occurs in a keystroke operation.

In Embodiments 1 to 3, a tablet-type personal digital assistant is illustrated as an example electronic device, the electronic device according to embodiments are not limited thereto. For example, the embodiments are applicable to any electronic device having a touch panel, e.g., a mobile phone, a PDA, a game machine, a car navigation system, or an ATM.

Although Embodiments 1 to 3 each illustrate a touch panel that covers the entire display surface of the display section 12, this is not a limitation. For example, a touch panel function may be provided only in a central portion of the display surface, while the peripheral portion may not be covered by anything that confers a touch panel function. In other words, the touch panel may at least cover the input operation area of the display section.

Although the touch panel 11 and the display section 12 are illustrated as separate members in Embodiments 1 to 3, this is not a limitation. For example, the touch panel 11 may be adhesively bonded to the display section 12. Alternatively, the display section 12 may have a function of detecting touched positions. In other words, it suffices if touched positions can be detected.

Although Embodiments 1 to 3 illustrate that the touch panel 11 is vibrated, this is not a limitation. For example, in the case where a cover glass is placed outside the touch panel 11, the cover glass may be vibrated. In other words, it suffices if any member that is touched by the user is vibrated.

In one embodiment, an electronic device 10 according to an embodiment comprises: a display section 12 for displaying an operation area 45 including a reference area 41 and a non-reference area 42; a touch panel 11 provided on a display surface side of the display section 12; an informing section 13 for informing a user of an operation status of the user; a control section 20 for controlling an operation of the informing section 13; and a distinction section 16 for distinguishing between a first operation where the user searches for the reference area 41 on the touch panel 11 and a second operation which is a key input operation to the operation area 45, wherein the control section 20 controls the operation of the informing section 13 based on a result of distinction by the distinction section 16.

In one embodiment, the informing section 13 is a tactile presentation section for presenting a tactile sensation to the user.

In one embodiment, the tactile presentation section is a vibration section for vibrating the touch panel 11.

In one embodiment, the first operation is an operation where a touched position of the user on the touch panel 11 gradually changes; and the second operation is a keystroke operation on the touch panel 11.

In one embodiment, the control section 20 varies the operation of the vibration section depending on whether the user is touching the non-reference area 42 or touching the reference area 41 in the first operation.

In one embodiment, the control section 20 disables key input to the operation area 45 during the first operation.

In one embodiment, after the user has continuously touched the reference area 41 for a predetermined time or longer, the control section 20 enables key input to the operation area 45, so that key input to the operation area 45 is no longer disabled.

In one embodiment, after the user has continuously touched the reference area 41 for the predetermined time or longer, the control section 20 enables key input to the operation area 45 when the touch on the reference area 41 ceases, so that key input to the operation area 45 is no longer disabled.

In one embodiment, when the user has not touched the operation area 45 for a predetermined time or longer, the control section 20 disables key input to the operation area 45, so that key input to the operation area 45 is no longer enabled.

In one embodiment, the control section 20 varies a vibration pattern of the vibration section depending on the operation being the first operation or the second operation.

In one embodiment, the control section 20 controls the vibration section to vibrate in a first vibration pattern when the user touches the reference area 41 in the first operation; and the control section 20 controls the vibration section to vibrate in a second vibration pattern different from the first vibration pattern when the user touches the operation area 45 in the second operation.

A program according to the an embodiment is a program for causing an electronic device 10 to execute an operation of informing a user of an operation status of the user on a touch panel 11, the program causing the electronic device 10 to execute: a step of distinguishing between a first operation where the user searches for a reference area 41 on the touch panel 11 and a second operation which is a key input operation to the operation area 45; and a step of controlling an operation of informing the user based on a result of distinction.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The present disclosure is useful for any electronic device that is capable of touch operation by the user.

What is claimed is:

1. An electronic device comprising:
   an integrated touchscreen panel touched by a user, comprising a display section for visually rendering an operation area that includes a reference area and a non-reference area;
   an informer informs the user of an operation status of the user;
   a controller controls an operation of the informer; and
   a distinguisher distinguishes between a first operation where the user searches for the reference area on the integrated touchscreen panel and a second operation which is a key input operation to the operation area, wherein
   the controller controls the operation of the informer based on a result of distinction by the distinguisher,
   wherein the controller disables key input to the operation area during the first operation;
   wherein, when key input to the operation area is disabled during the first operation and the controller determines that the user has continuously touched the reference area for a predetermined time or longer, the electronic device indicates a change in input mode through a visual, auditory or tactile sensation, the controller enables key input to both the reference area and the non-reference area after the touch on the reference area ceases based on the determination that the user has continuously touched the reference area for the predetermined time or longer and then ceased touching the reference area, so that key input to the operation area is no longer disabled; and
   wherein when key input to the operation area is disabled during the first operation and the controller determines that the user has not continuously touched the reference area, for the predetermined time or longer while key input is disabled, key input to the operation area remains disabled.

2. The electronic device of claim 1, wherein the informer is a tactile presentation section for presenting a tactile sensation to the user.

3. The electronic device of claim 2, wherein the tactile presentation section is a vibration section for vibrating the integrated touchscreen panel.

4. The electronic device of claim 1, wherein,
   the first operation is an operation where a touched position of the user on the integrated touchscreen panel gradually changes; and
   the second operation is a keystroke operation on the integrated touchscreen panel.

5. The electronic device of claim 3, wherein the controller varies the operation of the vibration section depending on whether the user is touching the non-reference area or touching the reference area in the first operation.

6. The electronic device of claim 1, wherein, when key input to the operation area is enabled and the user has not touched the operation area for a predetermined time or longer, the controller disables key input to the operation area, so that key input to the operation area is no longer enabled.

7. The electronic device of claim 3, wherein the controller varies a vibration pattern of the vibration section depending on the operation being the first operation or the second operation.

8. The electronic device of claim 7, wherein, the controller controls the vibration section to vibrate in a first vibration pattern when the user touches the reference area in the first operation; and
   the controller controls the vibration section to vibrate in a second vibration pattern different from the first vibration pattern when the user touches the operation area in the second operation.

9. The electronic device of claim 1, wherein, the non-reference area includes a portion that is disposed apart from the reference area.

10. A program embodied on a non-transitory medium for causing an electronic device to execute an operation of informing a user of an operation status of the user on an integrated touchscreen panel for visually rendering an operation area that includes a reference area and a non-reference area,
    the program causing the electronic device to execute:
    a step of distinguishing between a first operation where the user searches for the reference area on the integrated touchscreen panel and a second operation which is a key input operation to the operation area;
    a step of controlling an operation of informing the user based on a result of distinction;
    a step of disabling key input to the operation area during the first operation;
    a step of indicating a change in input mode through a visual, auditory or tactile sensation when key input to the operation area is disabled during the first operation and the user has continuously touched the reference area for a predetermined time or longer;

a step of enabling key input to both the reference area and the non-reference area, so that key input to the operation area is no longer disabled, wherein when key input to the operation area is disabled during the first operation, the key input to both the reference area and the non-reference area is enabled after touch on the reference area ceases based on a determination that the user has continuously touched the reference area for a predetermined time or longer and then ceased touching the reference area; and a step of determining that the user has not continuously touched the reference area, for the predetermined time or longer while key input is disabled, wherein when key input to the operation area is disabled during the first operation and the user has not continuously touched the reference area, for the predetermined time or longer while key input is disabled, key input to the operation area remains disabled.

11. The program of claim 10, wherein, the non-reference area includes a portion that is disposed apart from the reference area.

* * * * *